Oct. 3, 1967   R. L. DORNER   3,344,790
SURGICAL SUTURING DEVICE WITH AUXILIARY SPOOL-BRAKE MEANS
Filed Nov. 2, 1964
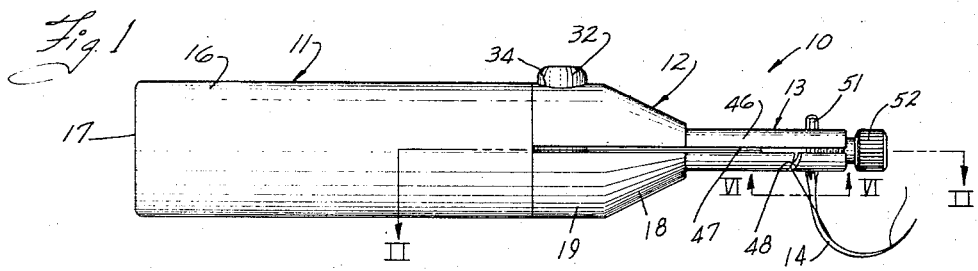
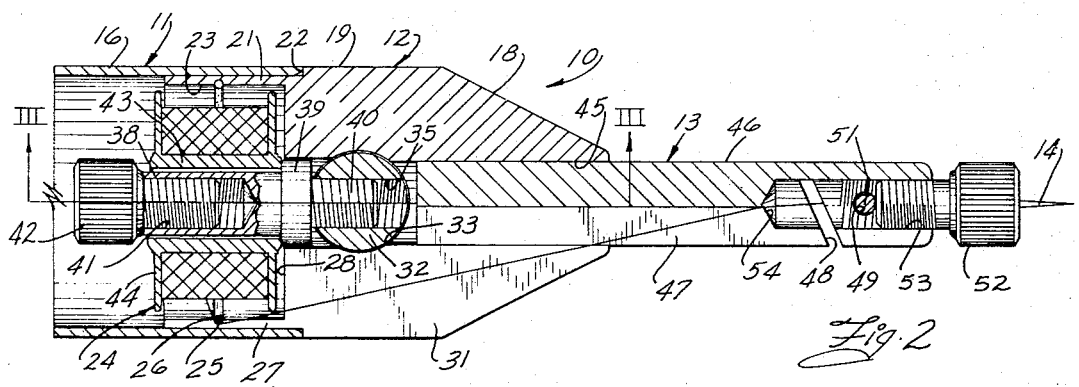
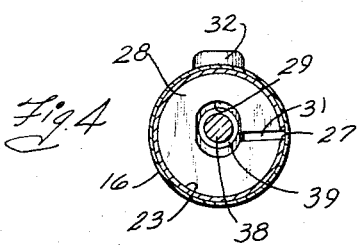
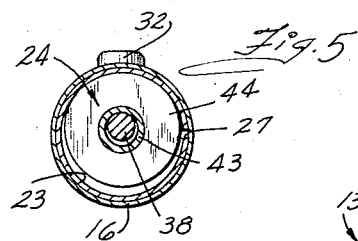
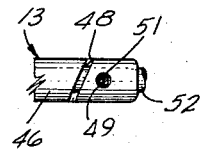
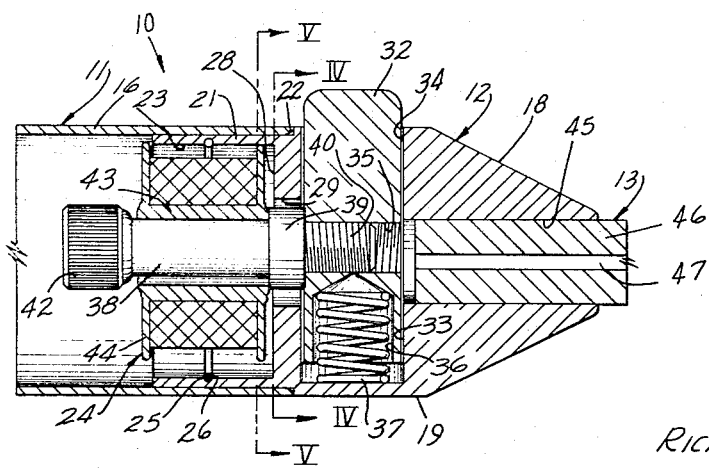
INVENTOR.
RICHARD L. DORNER
BY
Woodhams, Blanchard & Flynn
ATTORNEYS

United States Patent Office 3,344,790
Patented Oct. 3, 1967

3,344,790
SURGICAL SUTURING DEVICE WITH
AUXILIARY SPOOL-BRAKE MEANS
Richard L. Dorner, 5460 S. 12th St., Texas Township,
Kalamazoo County, Mich.
Filed Nov. 2, 1964, Ser. No. 408,072
5 Claims. (Cl. 128—340)

ABSTRACT OF THE DISCLOSURE

A suturing instrument comprising a handle having a recess therein, a spool being mounted within the recess for supplying thread to the suturing needle. The spool is mounted for movement between first and second positions, the spool in the first position being in contact with the walls of the recess so as to effectively brake the spool and prevent rotation thereof while movement of the spool to the second position by means of a spring-actuated plunger assembly moves the spool out of contact with the wall so as to permit thread to be unwound therefrom. Thread from the spool passes through aligned axial slots formed within the housing and the needle holder of the instrument with the thread then passing through a transverse slot formed in the end of the needle holder adjacent the needle for interconnection thereto, the thread thus being maintained entirely within the suturing instrument so as to prevent breakage or damage thereto.

---

This invention relates to an improved suturing instrument and, more particularly, relates to a suturing instrument having improved brake means for controlling the feeding of the suturing material from the spool, and in which the suturing material is substantially completely disposed within the instrument until it is close to the needle thereof in order to minimize breakage.

A wide variety of suturing instruments, having a self-contained spool for holding suturing materials, have been proposed heretofore. Many of these instruments have a brake for restraining rotation of the spool but the prior art brakes are difficult to operate and expensive to make. Moreover, in many such instruments either the suturing material is exposed so that it is relatively easily broken, or else it is difficult to thread the suturing material through the instrument.

Accordingly, it is an object of this invention to provide an improved suturing instrument having an improved brake mechanism which is of simple and inexpensive construction and which is reliable in operation so that feeding of the suturing material can be controlled in an effective manner.

It is a further object of this invention to provide an improved suturing instrument in which the suturing material is substantially completely disposed within the instrument so that it is protected against injury, but in which the suturing material can be threaded through the instrument in an easy and convenient fashion.

It is a further object of this invention to provide an improved suturing instrument, as aforesaid, which is of rugged construction, which can be sterilized easily and which is convenient to use.

Other objects and advantages of the invention will become apparent to persons acquainted with equipment of this type upon reading the following disclosure and inspecting the accompanying drawings.

In the drawings:

FIGURE 1 is an elevational view of the improved suturing instrument according to the invention.

FIGURE 2 is a sectional view taken along the line II—II of FIGURE 1.

FIGURE 3 is a sectional view taken along the line III—III of FIGURE 2.

FGURE 4 is a sectional view taken along the line IV—IV of FIGURE 3.

FIGURE 5 is a sectional view taken along the line V—V of FIGURE 3.

FIGURE 6 is a sectional view taken along the line VI—VI of FIGURE 1.

Referring to the drawings, the invention provides a surgical suturing instrument 10 which is comprised of a handle 11, a spool holder 12 mounted on one end of the handle, a needle holder 13 projecting axially from the spool holder, and a curved needle 14 projecting laterally from said needle holder close to the outer end thereof.

The handle 11 is an elongated, cylindrical casing 16 which has an end wall 17 at one end thereof and which is open at the other end. The casing 16 is of such length that it can be conveniently held in the hand of the user thereof.

The spool holder 12 is comprised of a frusto-conical outer part 18, a cylindrical intermediate part 19 preferably of the same diameter as the casing 16, and a cylindrical inner part 21 whose outside diameter is such that it can snugly and slideably fit within the open end of the casing 16. The spool holder 12 has a shoulder 22 at the juncture of the parts 19 and 21, which shoulder abuts against the edge of the casing 16. The cylindrical inner part 21 has an internal recess 23 for receiving a spool 24. The cylindrical inner part 21 has a lengthwise extending slot 27 through the side wall thereof through which the suturing material can extend as further described hereinbelow. A lock ring 25 is received in a groove 26 in the wall of the recess 23. The lock ring 25 bridges the slot 27 and serves as a guide for the suturing material. For this purpose, the lock ring has a rounded cross-section.

The spool holder 12 has a transversely extending inside wall 28 substantially at the juncture of the parts 19 and 21, which wall forms an end wall of the recess 23. The wall 28 has an elongated, substantially oval-shaped central opening 29 and, also, has a slot 31 extending laterally outwardly therefrom substantially at the midpoint of one of the long sides of said central opening. The slot 31 communicates and is aligned with the slot 27 in the side wall of the cylindrical inner part 21.

A spring-urged plunger 32 extends substantially radially through a transverse bore 33 in the intermediate part 19 of the spool holder 12 about the transverse wall 28 and thence through an opening 34 in the side wall of the spool holder. The plunger 32 has a recess 36 in the inner end thereof and a coil spring 37 is disposed within the recess and bears against said plunger and the opposing side wall of the spool holder 12 continuously urges the plunger 32 out of the casing. It will be observed that the axis of the plunger 32 is substantially aligned with the major axis of the opening 29. Also, the axis of the plunger 32 is offset substantially 90° from the slot 31. The plunger has a threaded hole 35 therethrough as further described hereinbelow.

A post 38 has a threaded end 40 for securing said post to the plunger 32 by threadedly engaging the threaded hole 35 of the plunger 32. The post 38 therefore retains the plunger 32 in the spool holder 12 against the constant urging of the spring 37.

The post 38 extends axially of the spool holder 12 through the central opening 29 in the transverse wall 28. The post 38 has a flange 39 which is received in the opening 29 and which is of such size that it can move lengthwise in said opening but is held against any substantial sidewise movement therein. The post 38 extends substantially through the spool-receiving recess 23 and it has a substantially axially extending threaded opening 41 in the outer end thereof.

A spool 24 of any convenient, suitable type is loosely sleeved on the post 38 and is retained thereon by a screw 42 which is threaded into the opening 41. The spool 24 includes a central core 43 and flanges 44 at the opposite axial ends of the core. The spool 24 is rotatable with respect to the post but is capable of only slight radial movement with respect thereto so that it moves therewith when the post 38 moves along the opening 29. The diameter of the flanges 44 is appreciably less than the internal diameter of the recess 23 so that the spool 24 can move transversely within the recess with the post 38.

The spring 37 urges the plunger 32 towards its outermost (uppermost in FIGURE 3) position which causes the inner flange 44 to be urged into engagement with the internal wall of the recess 23 under the pressure of the spring 37. The spring 37 is moderately strong so that it will urge the inner flange 44 into fairly tight engagement with the internal wall of the recess 23 so that the spool 24 will be restrained against rotation. However, when the plunger 32 is moved inwardly, the spool inner flange 44 is free to move away from the internal wall of the recess 23 so that the spool will be free to rotate with respect to the post 38 and the suturing material can be unwound therefrom.

The needle holder 13 comprises a round rod 46 which extends into an axial opening 45 in the spool holder 12. The rod 46 has an axially extending, straight slot 47 therein which communicates with and forms an extension of the slot 31 in the spool holder 12. A lateral extension slot 48 extends from the slot 47, close to the outer end thereof, approximately half-way around the rod. The lateral slot 48 is inclined toward the spool holder 12.

The rod 46 has a transverse bore 49 therethrough between the lateral slot 48 and the free end of the rod 46, with one end of the transverse bore 49 being directly above the lateral slot 48. The shank 51 of the needle 14 extends through the bore 49 and is releasably fixed in position therein by a set screw 52 which is threaded into an axially extending opening 53 in the rod 46. It will be observed that the opening 53 intersects the slot 47 and that its inner end is inwardly of the lateral slot 48. Also the inner end 54 of opening 53 is conical and serves for guiding the suturing material to the slot 48.

*Operation*

In preparing the instrument for use, a spool 24 having suturing material wound thereon is mounted on the post 38 as previously described. The suturing material is passed through the slot 27 below the lock ring 25, and then passes around the lock ring 25 and upwardly through the slot 31 and the slot 47 and thence through the slot 48 directly under the curved end of the needle 14. It will be observed that the suturing material does not rub against any of the parts except for the lock ring 25 and the edge of the slot 48 which can be made smooth so that they will not tend to cut the suturing material. The material does not contact the spool flanges 44 and it extends upwardly in a substantially straight line substantially completely disposed within the slot 31 and 47 so that there is little opportunity for it to become broken.

The spring 37 urges the spool 24 to the position shown in FIGURE 3 in which the inner flange 44 contacts the internal wall of the recess 23 so that the spool is restrained against rotation. When the plunger 32 is moved inwardly, such as by the thumb of the user, the inner flange 44 is moved out of contact with the internal wall of the recess 23 so that the spool 24 is free to rotate on the post 38 whereby the suturing material can be pulled from the spool and can be used for suturing purposes in the usual manner.

When the pressure on the plunger 32 is relieved, the spring 37 moves the plunger 32 and thereby the post 38 and the spool 24 in order to cause the inner flange 44 to re-engage the internal wall of the recess 23 whereupon the spool is again held against rotation.

The needle 14 serves for puncturing the flesh on opposite sides of the incision to be sutured and also serves for drawing the thread therethrough. This procedure is conventional and, hence, it is not believed to require detailed description.

While a particular preferred embodiment of the invention has been described, the invention contemplates such changes or modifications therein as lie within the scope of the appended claims.

What is claimed is:

1. A surgical suturing instrument, comprising:
a spool holder having an internal recess therewithin;
a spool rotatably disposed within said recess and being of smaller size than said recess so that it can be moved within said recess between a position in which said spool engages the wall of said recess so as to be restrained against rotation and a position in which said spool is spaced from said wall so as to be free to rotate;
means for moving said spool between said positions, said means for moving said spool comprising a resiliently urged actuating member mounted in said spool holder for movement in a direction perpendicular to the axis of rotation of said spool; and
a needle holder projecting away from said spool holder.

2. A surgical suturing instrument, comprising:
a spool holder having an internal recess therewithin;
a spool rotatably disposed in said recess and being of smaller size than said recess so that it can be moved within said recess between a position in which said spool engages the wall of said recess so as to be restrained against rotation and a position in which said spool is spaced from said wall so as to be free to rotate;
a spring-urged plunger mounted in said spool holder for movement in a direction perpendicular to the axis of rotation of said spool;
a post secured to said plunger and extending transverse thereto, said spool being loosely mounted on said post for rotation with respect thereto, said spool being movable with said post in response to movement of said plunger;
a needle holder projecting away from said spool holder; and
means for guiding thread from said spool to said needle holder.

3. A surgical suturing instrument according to claim 2, in which said spool holder has a transverse wall between said recess and said plunger, said wall having an elongated opening therethrough extending in the direction of movement of said plunger, said post extending through said opening and being movable lengthwise therein.

4. A surgical suturing instrument, comprising:
a spool holder having a spool-receiving recess therewithin and a spool mounted in said recess;
brake means for releasably restraining said spool against rotation;
a needle holder projecting away from said spool holder;
means defining a slot through the side wall of said spool holder;
means defining a first lengthwise slot in the side wall of said needle holder, said lengthwise slot being in communication with and aligned with the slot through the side wall of said spool holder whereby suturing material can be extended from said spool through said slots so as to be substantially completely disposed within said spool holder and said needle holder;
means defining a second slot in the side wall of said needle holder, said second slot extending transverse to said lengthwise slot and extending partway around said needle holder;

means defining a central bore in said needle holder opening through the outer end thereof and extending partway therealong to a point inwardly of said second slot;

said lengthwise slot extending the full length of said needle holder and intersecting said central bore, said central bore having an inclined inner end for guiding the suturing material to said second slot;

a needle mounted in said needle holder near the end thereof remote from said spool holder and arranged so that suturing material can be threaded therethrough, said needle having a shank extending transversely through said needle holder adjacent said second slot so that the suturing material can be fed from said second slot directly to said needle; and a screw threaded into said central bore for releasably securing said needle to said needle holder.

5. A surgical suturing instrument, comprising:

a handle;

a spool holder including a portion telescopically mounted on said handle, said spool holder having an internal recess in the portion thereof telescopically mounted on said handle and having a transverse bore therein and opening through one side thereof, there being a wall between said recess and said bore, said wall having an elongated opening therethrough, said spool holder having an axially extending bore extending from adjacent said transverse bore through the outer end of said spool holder, and means defining an axially extending, straight slot through the side wall of said spool holder and communicating with said recess;

a needle holder in the form of a rod mounted within said axial bore and secured to said spool holder, said rod having a lengthwise extending slot therein communicating with and constituting an extension of said slot in said spool holder, means defining a threaded bore in said rod extending from the outer end thereof partway along the length thereof, means defining a needle opening through said rod adjacent the outer end thereof, said needle opening extending perpendicularly to said rod slot, said rod having a second slot extending transverse to said first slot partway around the periphery of the rod;

a curved needle having a shank extending through said needle opening and a screw threaded into said threaded bore for releasably securing said needle to the rod;

a manually operable, spring-urged plunger mounted in said transverse bore for movement therewithin;

a post secured to said plunger and extending through said opening into said recess; and a spool disposed in said recess and loosely sleeved on said post whereby said spring-urged plunger acting through said post normally positions said spool so as to restrain rotation of said spool and manual actuation of said plunger frees said spool to permit rotation thereof.

References Cited

UNITED STATES PATENTS

| | | | |
|---|---|---|---|
| 373,372 | 11/1887 | King | 128—340 |
| 962,218 | 6/1910 | Boyer | 128—340 |
| 1,152,890 | 9/1915 | Gaydosh | 223—104 |
| 2,393,911 | 1/1946 | Karle | 128—340 |
| 2,439,383 | 4/1948 | Erickson | 128—340 |
| 2,478,255 | 8/1949 | Drow | 223—104 X |
| 2,690,150 | 9/1954 | Mollis | 112—169 X |
| 2,738,140 | 3/1956 | Thompson | 242—129.8 |
| 3,074,761 | 1/1963 | Ryan | 297—388 |

FOREIGN PATENTS

| | | |
|---|---|---|
| 156,440 | 6/1939 | Austria. |
| 259,450 | 5/1913 | Germany. |

RICHARD A. GAUDET, *Primary Examiner.*

DALTON L. TRULUCK, *Examiner.*